(12) United States Patent
Pettersson

(10) Patent No.: US 7,220,157 B2
(45) Date of Patent: May 22, 2007

(54) ARRANGEMENT AND METHOD FOR PARALLEL ALIGNMENT OF PROPELLER SHAFTS AND MEANS FOR PARALLEL ALIGNMENT

(75) Inventor: Patrik Pettersson, Angered (SE)

(73) Assignee: AB Volvo Penta, Gothenburg (SE)

( * ) Notice: Subject to any disclaimer, the term of this patent is extended or adjusted under 35 U.S.C. 154(b) by 0 days.

(21) Appl. No.: 11/553,343

(22) Filed: Oct. 26, 2006

(65) Prior Publication Data

US 2007/0046241 A1 Mar. 1, 2007

Related U.S. Application Data

(63) Continuation of application No. PCT/SE2004/000648, filed on Apr. 26, 2004.

(51) Int. Cl.
*B63H 20/32* (2006.01)

(52) U.S. Cl. .......................................... 440/78; 318/588
(58) Field of Classification Search ..................... None
See application file for complete search history.

(56) References Cited

U.S. PATENT DOCUMENTS

| 3,349,744 | A | | 10/1967 | Marcier |
| 3,913,517 | A | | 10/1975 | Lohse et al. |
| 4,595,867 | A | | 6/1986 | Cognevich, Sr. et al. |
| 5,313,397 | A | * | 5/1994 | Singh et al. ................ 318/588 |
| 5,361,024 | A | | 11/1994 | Wisner et al. |
| 2003/0079668 | A1 | | 5/2003 | Morvillo |

FOREIGN PATENT DOCUMENTS

SE 508314 C2 9/1998

* cited by examiner

*Primary Examiner*—Lars A Olson
(74) *Attorney, Agent, or Firm*—Novak Druce & Quigg, LLP

(57) ABSTRACT

An arrangement and method for parallel alignment of propeller shafts in a first and a second underwater housing arranged on the hull of a vessel, which underwater housings are arranged to rotate around an axis of rotation which is angled in relation to the propeller shafts arranged in each underwater housing, which arrangement includes a servo motor arranged for each underwater housing, which servo motor is arranged to rotate said underwater housing. A position sensor arranged for each servo motor, which position sensor is arranged to detect an angular position of the underwater housing. A control unit in which a reference angular position of the underwater housing is arranged to be stored during a calibration of the position of the underwater housing; and a calibrator of the position of the underwater housings by storing output signals from the position sensors in the control unit during a parallel alignment of propeller shafts in two underwater housings arranged on the hull of a vessel.

16 Claims, 4 Drawing Sheets

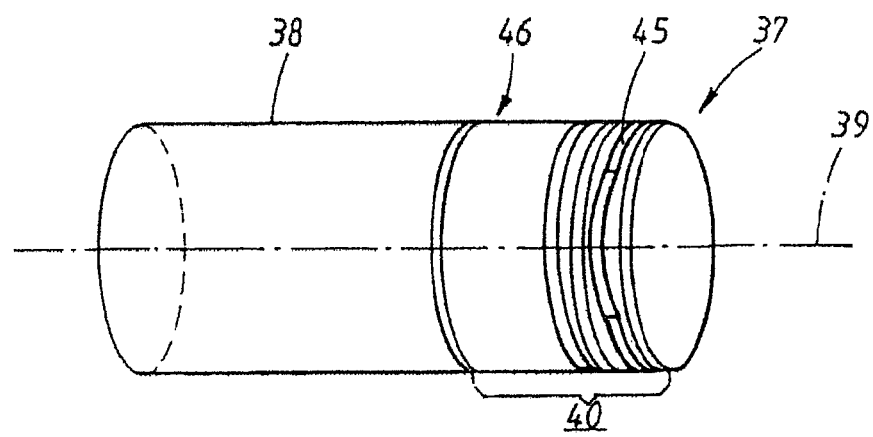
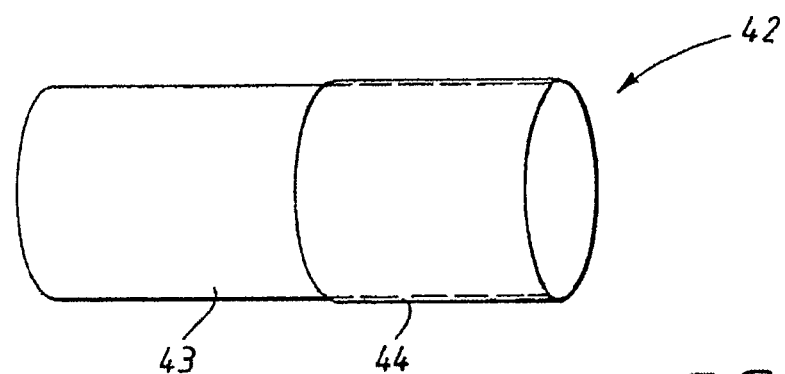
FIG.3
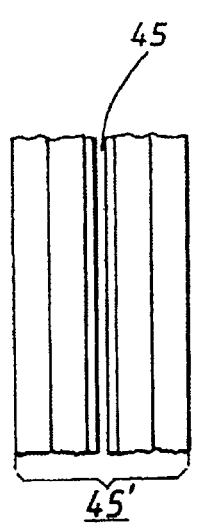
FIG.4
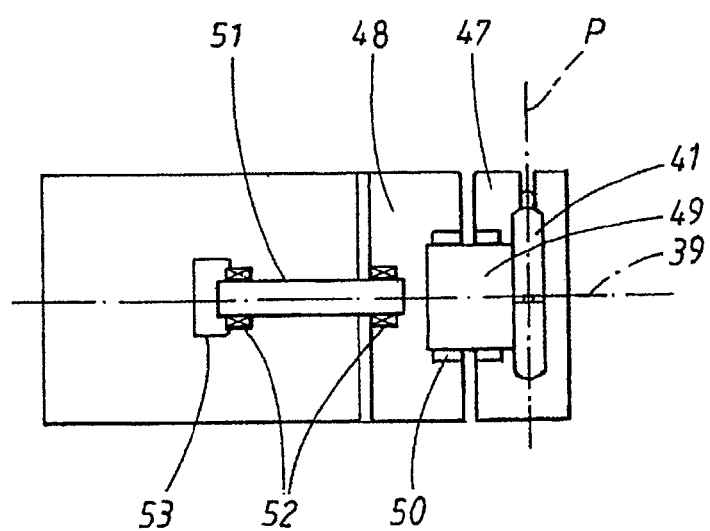
FIG.5

ARRANGEMENT AND METHOD FOR PARALLEL ALIGNMENT OF PROPELLER SHAFTS AND MEANS FOR PARALLEL ALIGNMENT

CROSS-REFERENCE TO RELATED APPLICATIONS

The present application is a continuation patent application of International Application No. PCT/SE2004/000648 filed 26 Apr. 2004 which is published in English pursuant to Article 21(2) of the Patent Cooperation Treaty. Said application is expressly incorporated herein by reference in its entirety.

FIELD

The present invention relates to an arrangement for parallel alignment of propeller shafts as claimed in the preamble to claim 1. The arrangement is used to calibrate position sensors in two underwater housings, each supporting one propeller shaft, so that a servo motor arranged in association with the underwater housing for setting the position of the underwater housing can position said propeller shafts in a position where they are arranged in parallel.

The invention also relates to a means for parallel alignment which comprises a first calibrating device with an adapter and a housing that can rotate around an axis of rotation and that supports a light source which emits rays of light within a plane at right angles to the axis of rotation, and a second calibrating device with an adapter and a reflective surface upon which the rays of light are reflected, with the first calibrating device comprising a target area, where the axis of rotation of the first calibrating device and the reflecting surface of the second calibrating device are parallel when the ray of light which was emitted from the light source of the first calibrating device is reflected on the reflecting surface of the second calibrating device and incides within a target area arranged on the first calibrating device. The means for parallel alignment is advantageously utilized for aligning the propeller shafts in a parallel position whereby position sensors arranged in an arrangement for setting an angular position of an underwater housing by means of a servo motor can be calibrated.

The invention also relates to a method for parallel alignment of propeller shafts in a first and a second underwater housing arranged on the hull of a vessel. The underwater housings can be rotated around an axis of rotation. A servo motor is arranged to rotate the underwater housing to the required position. The servo motor is controlled by a control unit which, in addition to an input signal corresponding to the required position of the underwater housing, receives an input signal from a position sensor which is arranged to detect the set angular position of the underwater housing. The method is used for calibrating position sensors in two underwater housings so that the input signals from the position sensors, corresponding to an initial position where the propeller shafts are aligned in parallel, can be stored in the control unit.

BACKGROUND

In order to achieve planing speedboats, it is often necessary to install several drives in one hull. One type of boat which is driven at planing speeds consists of boats with a V-shaped hull designed for planing. With such a hull, a drive is suspended on each side of the center line of the hull. The drives comprise an underwater housing projecting downwards from the outside of the hull, which housing can be rotated in relation to the hull. An at least essentially vertical drive shaft is mounted in the underwater housing in such a way that it can rotate. The drive shaft drives an at least essentially horizontal propeller shaft via a bevel gear comprised in the underwater housing. Such a type of boat is known through, for example, SE-9402272-0.

For maneuvering such boats, the angle of rotation of the underwater housing around the axis of rotation of the underwater housing is set via a servo motor. The servo motor is controlled by a control unit which, in addition to an input signal corresponding to the required position of the underwater housing, receives an input signal from a position sensor arranged to detect the set angular position of the underwater housing.

In order to be able to obtain good operating economy and performance and to reduce wear on bearings incorporated in the drives, it is important that the propeller shafts can be aligned in a parallel position. It is therefore important to calibrate the position sensors in a reference position when the propeller shafts are aligned parallel to each other and to the keel line of the boat.

Conventionally, the position sensors are calibrated by the output signal from the position sensors being stored in a control unit after the propeller shafts have been placed in a parallel position. The parallel alignment is verified by the use of a mechanical tool which is fitted onto the respective propeller shaft or underwater housing. The mechanical tool comprises two mechanically-connected adapters which are fitted onto their respective underwater housing into a docking module arranged for the purpose. The fitting can only be carried out when the propeller shafts are parallel, as the mechanical tool consists of a rigid measure. Such a method for parallel alignment and such a tool for parallel alignment have considerable disadvantages. Firstly, a tool must be produced for each type of boat, as the tool cannot be used for boats of different dimensions. In addition, the underwater housing and tool can be subjected to large forces if the tool is fitted onto the underwater housings or the propeller shafts when they are in a position that is not completely parallel. In addition, after such an incorrect fitting, the tool can be deformed, so that it can no longer be used for parallel alignment of the propeller shafts.

SUMMARY

An object of the invention is to provide an arrangement for parallel alignment of propeller shafts in a first and a second underwater housing arranged on the hull of a vessel, where the abovementioned problems associated with conventional mechanical parallel alignment tools are eliminated. This object is achieved by an arrangement for parallel alignment of propeller shafts in a first and second underwater housing arranged on the hull of a vessel as claimed in the characterizing part of claim 1. The invention utilizes a means for calibration comprising a first calibrating device which is attached in a first underwater housing and a second calibrating device which is attached in the second underwater housing, where the first calibrating device comprises a light source which emits rays of light in a direction within a plane at right angles to the propeller shaft in the first underwater housing and in a direction towards the propeller shaft in the second underwater housing, where the second calibrating device comprises a reflecting surface for rays of light and where the first calibrating device comprises a target area where the propeller shafts can be ascertained to be parallel when a ray of light which is emitted from the first calibrating device is reflected on the reflecting surface of the second calibrating device and incides within said target area.

By utilizing a means for calibration where a separate device is placed on each underwater housing without being connected to each other mechanically, it is possible to utilize the same calibrating devices on boats of different dimensions. In addition, the risk is eliminated of large stresses arising as a result of the calibrating tool being applied when the propeller shafts are in a position that is not completely parallel.

The invention also relates to a means for calibration comprising a first calibrating device with an adapter and a housing that can be rotated around an axis of rotation, which housing supports a light source which emits rays of light within a plane at right angles to the axis of rotation, and a second calibrating device with an adapter and a reflecting surface upon which rays of light are reflected, where the first calibrating device comprises a target area, where the axis of rotation of the first calibrating device and the reflecting surface of the second calibrating device can be ascertained to be parallel when a ray of light which is emitted from the light source of the first calibrating device is reflected on the reflecting surface of the second calibrating device and incides within a target area arranged on the first calibrating device. As claimed in the invention, the first calibrating device comprises a means for stabilization of the position of the rotating housing in a set angle of rotation around said axis of rotation, where said means for stabilization is arranged to return the housing to said set angle of rotation or to lock the housing at said set angle of rotation. Due to the fact that the calibrating device comprises a means for stabilization, the calibrating procedure is made significantly easier, as it is possible to carry out a rough setting while rotating the light source, whereby a plane of light can be utilized to find an approximately parallel position of the objects which are to be aligned in a parallel position. After the rough setting has been carried out, a fine adjustment can be carried out without rotating the light source, where a ray of light is directed towards the reflecting surface of the second calibrating device and where the ray of light is held in the set position by the stabilizing device.

The invention also relates to a method for parallel alignment of propeller shafts in a first and a second underwater housing arranged on a hull of a vessel, where the method comprises the following method steps: (a) application of a first calibrating device onto the first underwater housing; (b) application of a second calibrating device onto the second underwater housing, where the first calibrating device comprises a light source which emits rays of light in a direction within a plane at right angles to the propeller shaft in the first underwater housing and in a direction towards the propeller shaft in the second underwater housing, where the second calibrating device comprises a reflecting surface and where the first calibrating device comprises a target area for a ray of light which is reflected in said reflecting surface of the second calibrating device; (c) detection that the propeller shafts are parallel when a ray of light which is emitted from the light source of the first calibrating device is reflected on the reflecting surface of the second calibrating device and incides within said target area.

By means of the method, where each device is placed on a separate underwater housing without being mechanically connected to each other, it is possible to utilize the same calibrating devices for boats of different dimensions. In addition, the risk of large stresses arising as a result of the calibrating tool being applied when the propeller shafts are in a position that is not completely parallel is eliminated. As the underwater housings can be rotated around axes at right angles to the V-shaped bottom of the hull, it is the case that, when the housings are parallel to each other, they are also parallel to the keel line of the boat.

BRIEF DESCRIPTION OF THE DRAWINGS

The invention will be described below in greater detail with reference to the attached drawings in which:

FIG. 3 shows a means for parallel alignment as claimed in the invention;

FIG. 4 shows in detail a target area on a first calibrating device;

FIG. 5 shows in cross section a first calibrating device comprised in a means for parallel alignment as claimed in the invention;

DETAILED DESCRIPTION

Figure 1:
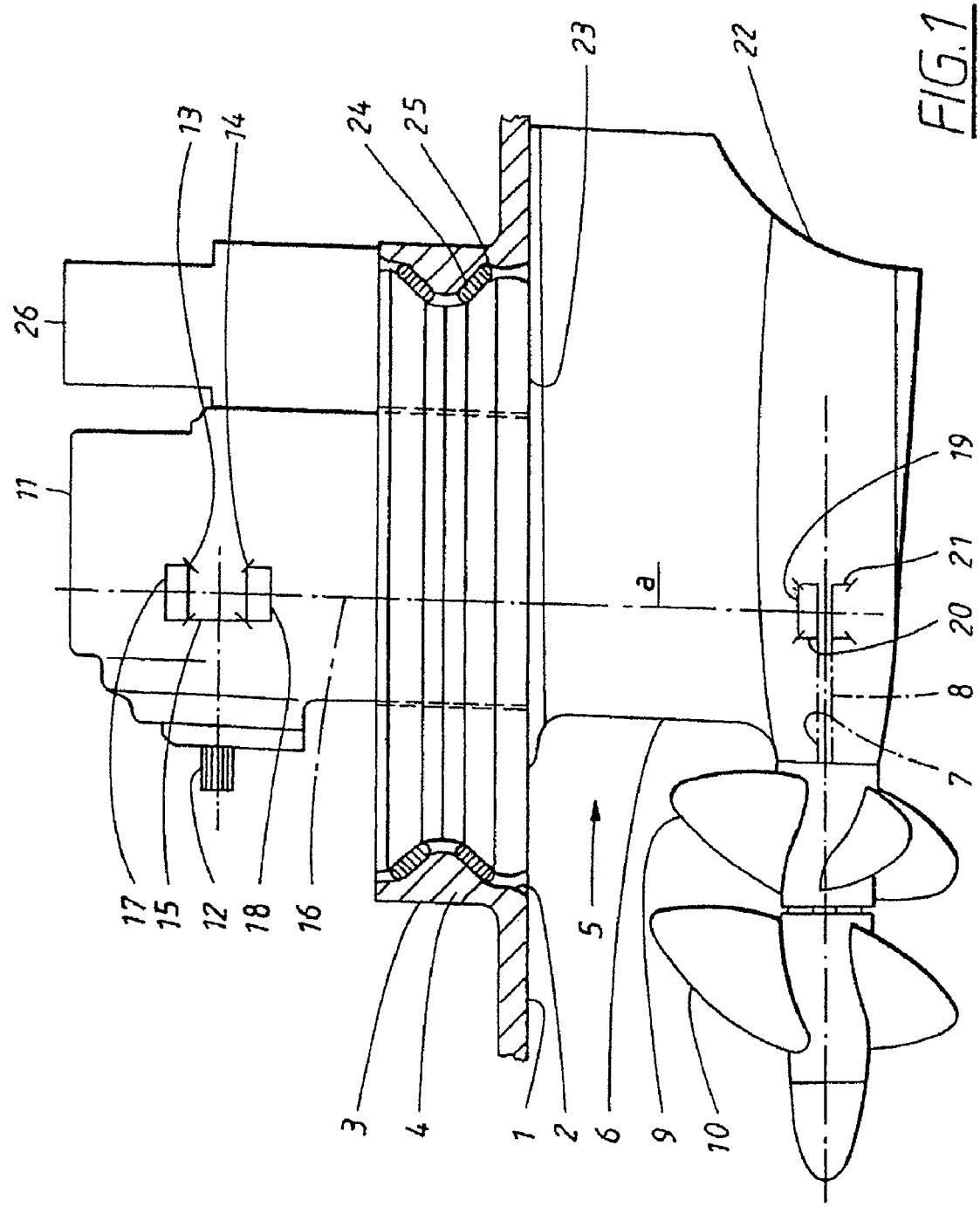
FIG. 1 shows a longitudinal section through a section of the bottom of a boat equipped with drives of the type with which the invention can be utilized.

In FIG. 1, the bottom of a boat's hull, designated 1, can consist of molded glass fiber reinforced polyester plastic. The bottom of the hull is designed with an opening 2, which is surrounded by a vertical sleeve 3, which projects up into the interior of the hull. The sleeve is preferably molded in one piece with the bottom 1 and is designed with an internal peripheral flange 4 which, in the embodiment shown, has an essentially triangular cross section.

The sleeve 3 with the flange 4 forms a suspension device for a propeller drive designated in general by 5 which, in the embodiment shown, has an underwater housing 6, in which two concentric propeller shafts 7 and 8, each with a propeller 9 and 10, are mounted in such a way that they can rotate. The underwater housing 6 is connected to a gearbox 11, in which a horizontal drive shaft 12 is mounted in such a way that it can rotate. The shaft 12 is designed to be connected to an outgoing shaft from a motor (not shown). The shaft 12 drives a vertical shaft 16 via a bevel gear enclosed in the gear box 11, which bevel gear comprises conical cog wheels 13, 14 and 15. The cog wheels 13 and 14 are mounted on the shaft 16 in such a way that they can rotate or alternatively can be locked on the shaft by means of a multidisk lubricated disk clutch 17 and 18 respectively to drive the shaft 16 in either rotational direction. The shaft 16 drives the propeller shafts 7 and 8 in opposite rotational directions via a bevel gear enclosed in the underwater housing 6 and comprising cog wheels 19, 20 and 21. In the embodiment shown, the propellers 9 and 10 are tractor propellers arranged in front of the underwater housing 6, at the rear end of which there is an outlet 22 for exhaust gases.

The drive 5 is suspended in the opening 2 by means of a suspension element designated in general by 3, which engages around the flange 4 with interlayers consisting of a pair of vibration-suppressing and sealing flexible rings 24 and 25. The underwater housing 6 is mounted in the suspension element 23 in a way that is not [lacuna] in greater detail so that it rotates around an axis of rotation "a" coinciding with the drive shaft 16. The rotation of the underwater housing 6 is achieved by means of a servomotor 26 that can be an electric motor with a cog wheel fixed on a shaft engaging with a gear ring connected to the underwater housing.

Figure 2:
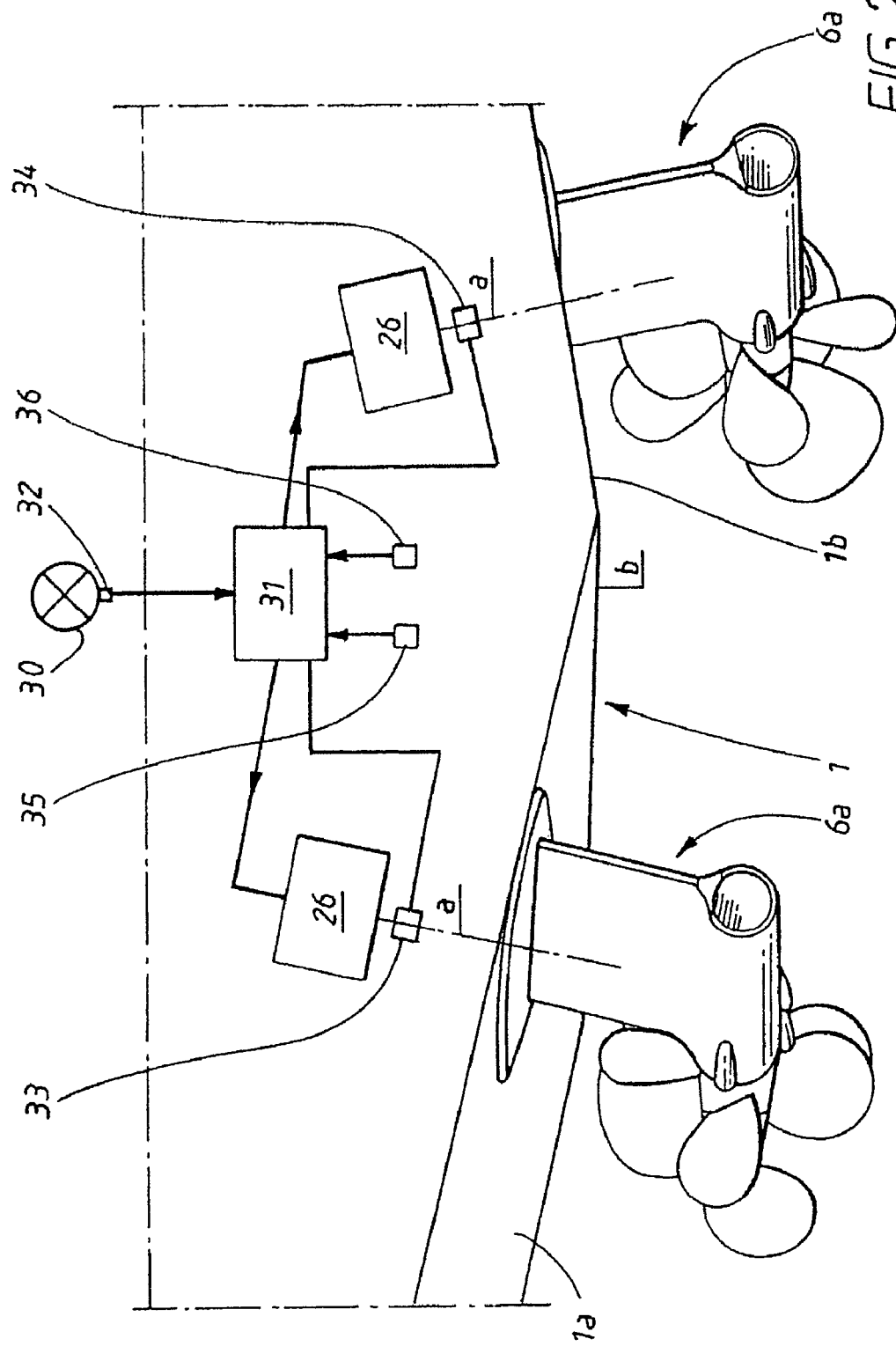
FIG. 2 shows a schematic illustration of the aft section of a boat with two drives of a type with which the invention can be utilized.

FIG. 2 shows the aft section of the hull of a boat with a V-shaped bottom 1. In each bottom section 1*a* and 1*b* respectively and at an equal distance from the center line "b" of the bottom, drives are suspended with underwater housings 6*a* and 6*b* of the type shown in FIG. 1. The underwater housings 6*a* and 6*b* can be suspended in the way that is illustrated in FIG. 1. In FIG. 2, a wheel at a helm is indicated by 30, and 31 is an electronic control unit that can comprise a computer. The control unit 31 is connected electrically to servomotors 26 for each drive. By means of the respective servomotors 26, the drives' underwater housings can be rotated independently of each other around their axes of rotation "a" in response to signals from the control unit 31 for steering the boat.

The wheel 30 is linked with a sensor 32 which detects the movement of the wheel from an initial position, for example driving straight forward, and sends a signal to the control unit 31 in response to the movement of the wheel. In addition, there are position sensors 33 and 34 arranged to detect the angle of rotation of the underwater housings 6*a* and 6*b* around their axes of rotation "a". The position sensors 33 and 34 communicate with the control unit 31. It is also possible for the position sensors to communicate directly with the servomotor and not to utilize a separate control unit. Where appropriate, a control unit can be utilized for each drive 5. In the embodiment shown, a shared control unit is utilized.

FIGS. 3 and 5 show an embodiment of a means for parallel alignment as claimed in the invention. The means for parallel alignment comprises a first calibrating device 37 with an adapter 38 and a housing 40 that can rotate around an axis of rotation 39, which housing supports a light source 41 which emits rays of light within a plane P at right angles to the axis of rotation 39, or alternatively the light source 41 can emit light continually in a sector of a circle. The means for parallel alignment comprises, in addition, a second calibrating device 42 with an adapter 43 and a reflecting surface 44.

The first calibrating device 37 comprises, in addition, the target area 45. The axis of rotation 39 of the first calibrating device and the reflecting surface 44 of the second calibrating device can be ascertained to be parallel when a ray of light which is emitted from the light source 41 of the first calibrating device 37 is reflected on the reflecting surface 44 of the second calibrating device and incides within the target area 45 arranged on the first calibrating device. The target area can be designed as shown in FIG. 4, where a larger area 45' which comprises the target area 45 is divided into increasingly narrower areas which lie successively closer to the target area. The partial areas form a scale where the deviation from the target area corresponds to the degree of deviation from the parallel. In order to make it easier to detect whether the ray of light incides within the target area, the target area and, where appropriate, an area around the target area, can advantageously be given a matt surface.

The adapters 38 and 43 in the first and second calibrating devices are preferably designed in such a way that they do not scratch the component onto which the adapter is to be docked for parallel alignment. For this purpose, if the means for parallel alignment is to be used for parallel alignment of two propeller shafts arranged in rotating underwater housings as claimed in the embodiment described above, the adapters can be designed in such a way that the shape of the adapters is arranged to fit the exhaust outlets 22 arranged in the underwater housings. The adapters 38 can advantageously be constructed in a material that does not constitute a danger of scratching the underwater housings, for example in rigid plastic.

The first calibrating device can, in addition, comprise a means 46 for stabilization of the position of the rotating housing 40 in a set rotational angle around the axis of rotation 39. The means 46 for stabilization is arranged to return the housing to said set angle of rotation or to lock the housing in said set angle of rotation. As claimed in an embodiment of the invention as shown in FIGS. 3 and 5, the means 46 for stabilization can be achieved by joining together a first housing body 47, which supports the light source 41, with a second housing body 48, which has a center of gravity that lies outside the axis of rotation 39, via a shaft 49 mounted in bearings 50 with a particular friction. The housing 40 is, as shown in FIG. 5, attached in the adapter 38 on a shaft 51 which is mounted with low-friction bearings 52. If the means for stabilization is to lock the housing 40 in a particular angular position, the housing 40 or the adapter 38 can be designed with a locking device 53, which locks the shaft 51 so that it cannot be moved freely. This can, for example, be arranged by the shaft 51 being displaced axially towards the locking device when locking is required. In an alternative simpler realization, the means for stabilization can be locked onto the rotating housing by means of a friction connection, for example by the end surfaces of the means for stabilization and of the rotating housing that face towards each other being provided with hook and loop fastening strips. In a non-locked position, the means for stabilization and the rotating housing are moved axially away from each other.

When the housing 40 is rotated without the adapter 38 and the second housing body 48 being locked to each other, both the first and the second housing bodies will be caused to rotate due to the friction in the bearing 50 being sufficiently high. The light source 41 is then caused to rotate and emits rays of light in a direction within a plane at right angles to the axis of rotation 39 of the first calibrating device. The housing 40 can be arranged to be open, so that the light source can sweep through a complete revolution when the light source is rotated. If required, the light source can be partially screened, so that light is only emitted during a part of the revolution. This can be advantageous when a powerful laser beam is utilized as the light source. The light source is preferably arranged to emit rays of light with an angle of dispersion exceeding 15° within a plane at right angles to the axis of rotation. In this way, a sufficient dispersion of the light is obtained to enable the ray of light to strike the second calibrating device. Instead of rotating the whole light generator, a rotating prism with a stationary light generator can be used as the rotating light source.

When the rotation of the light source is stopped, light is no longer obtained in a plane. Instead, the light strikes at a single point. By setting the objects which are to be aligned in parallel in such a way that the plane of light which is generated by the rotation of the light source strikes the reflecting surface of the second calibrating device, it can be ensured that the ray of light strikes the reflecting surface when the housing 40 is rotated. As the second housing body 48 has a center of gravity that lies outside the axis of rotation, the housing will assume the position where the potential energy of the housing 40 is minimal. By rotating the first housing body 47 in relation to the second housing body 48, an operator can ensure that the housing achieves its minimal potential energy in a required position where the ray of light strikes the reflecting surface 44 of the second calibrating device 42.

The reflecting surface 44 of the second calibrating device is preferably convex in shape in a direction towards the first calibrating device 37. In this way, a ray of light that strikes the reflecting surface 44 generates a diverging ray of light which occupies a plane in space. This means that it is easier for the reflected ray of light to strike the target area 45 on the first calibrating device. The reflecting surface can advantageously be designed as a cylindrical mirror.

Figure 6:
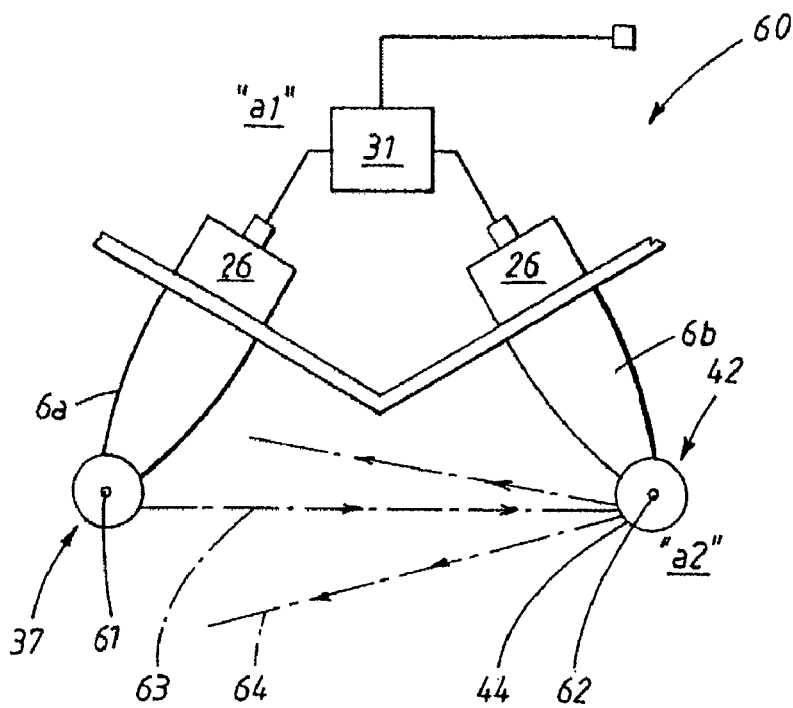
FIG. 6 shows schematically an arrangement for parallel alignment of propeller shafts in a first and a second underwater housing arranged on the hull of a vessel as claimed in the invention.

FIG. 6 shows an arrangement 60 for parallel alignment of propeller shafts 61, 62 in a first 6a and a second 6b underwater housing arranged on the hull of a vessel, which underwater housings can be rotated around their axes of rotation "a1" and "a2". The axes of rotation "a1" and "a2" are angled in relation to the propeller shaft 61, 62 arranged in each underwater housing. In accordance with what has been stated above, this angle can be a right angle, which means that the power transmission can be arranged effectively via a bevel gear. It is, however, possible to incline the axis of rotation in relation to the propeller shaft by utilizing a different type of transmission.

The arrangement for parallel alignment 60 comprises: (a) a servo motor 26 arranged for each underwater housing 6a, 6b, which servo motor is arranged to rotate said underwater housing; (b) a position sensor 33, 34 arranged for each servo motor 26, which position sensor is arranged to detect an angular position of the underwater housing; (c) a memory in which an angular position of the underwater housing is arranged to be stored during a calibration of the position of the underwater housing; and (d) a means 37, 42 for calibrating the position of the underwater housings 6a, 6b by storing output signals from the position sensors in a memory 31' during a parallel alignment of the propeller shafts 61, 62. The means for calibration is preferably designed in accordance with what was described above in connection with FIGS. 3–5. The memory can be arranged in association with the position sensor or alternatively can be arranged in a separate control unit 31.

The means for calibration comprises a first calibrating device 37 which is attached in a first underwater housing 6a and a second calibrating device 42 which is attached in the second underwater housing 6b. The first calibrating device 37 comprises a light source which emits rays of light 63 in a direction within a plane P1 at right angles to the propeller shaft 61 of the first underwater housing 6a and in a direction towards the propeller shaft 62 of the second underwater housing 6b. The second calibrating device 42 comprises a reflecting surface 44. The first calibrating device comprises a target area 45 where it can be ascertained that the propeller shafts are parallel when a ray of light 63 which is emitted from the light source 41 of the first calibrating device is reflected on the reflecting surface 44 of the second calibrating device and incides within said target area 45.

Figure 7:
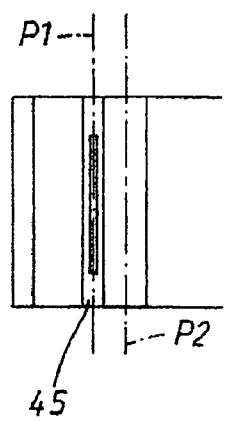
FIG. 7 shows a plane P1 comprising the outgoing ray of light and a reflected ray of light which is dispersed in a plane P2.

FIG. 7 shows a plane P1 comprising the outgoing ray of light 63 and a reflected ray of light 64 which is dispersed in a plane P2. As the reflected ray of light 64 does not incide within the target area, the alignment of the propeller shafts must be corrected before it can be ascertained that they are parallel.

Figure 8:
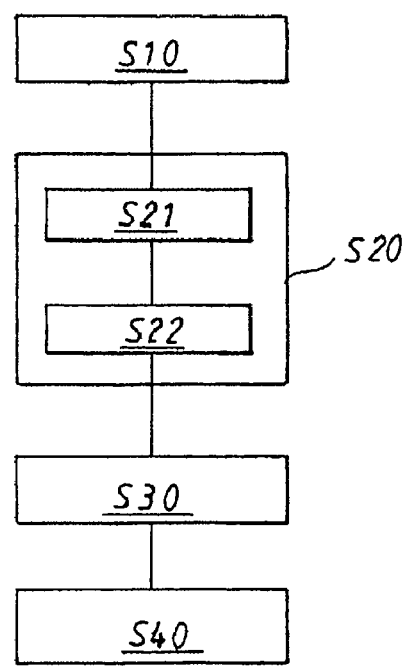
FIG. 8 shows a flow chart for a method as claimed in the invention for parallel alignment of propeller shafts in a first and a second underwater housing arranged on the hull of a vessel.

FIG. 8 shows a flow chart for a method for parallel alignment of propeller shafts in a first and a second underwater housing arranged on the hull of vessel.

The method comprises the following method steps and in which in a first method step S10, a first calibrating device is applied on the first underwater housing 6a and a second calibrating device is applied on the second underwater housing 6b. The first calibrating device comprises a light source which emits rays of light in a direction within a plane at right angles to the propeller shaft of the first underwater housing and in a direction towards the propeller shaft of the second underwater housing, where the second calibrating device comprises a reflecting surface and where the first calibrating device comprises a target area for a ray of light which is reflected in said reflecting surface of the second calibrating device.

In a second method step S20, the first or the second underwater housing is rotated to a position where the reflected ray of light strikes the target area on the first calibrating device. The second method step can preferably be carried out in two partial steps S21 and S22, if the calibrating device comprises a means for stabilization of the position of the rotating housing in a set angle of rotation around said axis of rotation. The means for stabilization is arranged to return the housing to said set angle of rotation and to lock the housing in said set angle of rotation. In the first partial step S21 corresponding to a first rough setting of the relative position of the propeller shafts, this is carried out by rotation of the light source. In a second partial step S22 corresponding to a fine adjustment of the relative position of the propeller shafts, this is carried out without rotation of the light source by said means for stabilization being used to fix the light source in a direction towards the reflecting surface of the second calibrating device.

In a third method step S30, it is detected whether the propeller shafts are parallel. If the propeller shafts can be rotated around axes that are angled in relation to each other and if they are designed symmetrically with regard to a plane through the keel line of the boat, it can be guaranteed that both propeller shafts will be parallel to the longitudinal axis "b" of the boat when a ray of light which is emitted from the light source of the first calibrating device is reflected on the reflecting surface of the second calibrating device and incides within said target area. If the rotating shafts are parallel to each other, either or both of the propeller shafts is/are firstly to be aligned parallel to the longitudinal axis "b" of the boat. This can be achieved by arranging one calibrating device parallel to the longitudinal axis "b" of the boat and the other calibrating device parallel to one of the propeller shafts.

In a fourth method step S40, output signals from a position sensor arranged in a control unit, such as a reference angular position of the underwater housing, are stored. The reference angular position corresponds to the value of the output signal from the position sensor that is obtained when the propeller shafts are aligned in their parallel position.

The invention is not limited to the embodiments described above, but can be varied freely within the framework of the following claims. For example, more than two underwater housings can be arranged on the boat.

What is claimed is:

1. An arrangement for parallel alignment of propeller shafts (5) in a first and a second underwater housing (6a, 6b) arranged on the hull of a vessel, which underwater housings can be rotated around an axis of rotation (a) which is angled in relation to the propeller shaft (61) arranged in each underwater housing (6a, 6b), which arrangement comprises:

a servo motor (26) arranged for each underwater housing (6a, 6b), which servo motor is arranged to rotate said underwater housing (6a, 6b);

a position sensor (33, 34) arranged for each servo motor (26), which position sensor is arranged to detect an angular position of the underwater housings (6a, 6b);

a memory (31') in which reference positions of the underwater housings (6a, 6b) are arranged to be stored during a calibration of the position of the underwater housing; and a means for calibration (38, 42) of the position of the underwater housings by storing output signals from the position sensors (33, 34) in said memory (31') during a parallel alignment of propeller shafts (61) in two underwater housings (6a, 6b) arranged on the hull of a vessel; and characterized in that said means for calibration (38, 42) comprises a first calibrating device (37) which is attached in a first underwater housing (6a) and a second calibrating device (42) which is attached in the second underwater housing (6b), where the first calibrating device (37) comprises a light source (41) which emits rays of light within a plane (P) at right angles to the propeller shaft (61) in the first underwater housing (6a) and in a direction towards the propeller shaft (61) in the second underwater housing (6b), where the second calibrating device (42) comprises a reflecting surface (44) and where the first calibrating device (37) comprises a target area (45), where it can be ascertained that the propeller shafts (61) are parallel when a ray of light which is emitted from the light source (41) of the first calibrating device is reflected on the reflecting surface (44) of the second calibrating device and incides within said target area (45).

2. The arrangement for parallel alignment of propeller shafts as claimed in claim 1, characterized in that the reflecting surface (44) of the second calibrating device is convex in a direction towards the first calibrating device.

3. The arrangement for parallel alignment of propeller shafts as claimed in claim 2, characterized in that the reflecting surface (44) of the second calibrating device consists of a cylindrical mirror.

4. The arrangement for parallel alignment of propeller shafts as claimed in claim 1, characterized in that the light source (41) of the first calibrating device is arranged to emit rays of light with an angle of dispersion exceeding 15° within a plane at right angles to the propeller shaft of the first underwater housing.

5. The arrangement for parallel alignment of propeller shafts as claimed in claim 1, characterized in that the light source (41) of the first calibrating device can be rotated around an axis of rotation through the propeller shaft.

6. The arrangement for parallel alignment of propeller shafts as claimed in claim 5, characterized in that the first calibrating device (37) comprises an adapter (38) and a housing (40) that can rotate around an axis of rotation (39) and that supports said light source (41), where the adapter (38) is arranged to be attached in said underwater housing (6a) in a position where said axis of rotation is parallel (39) to the propeller shaft (61).

7. The arrangement for parallel alignment of propeller shafts as claimed in claim 6, characterized in that the first calibrating device (37) comprises a means (46) for stabilization of the position of the rotating housing (40) in a set angle of rotation around said axis of rotation (39), where said means for stabilization (46) is arranged to return the housing (40) to said set angle of rotation or to lock the housing (40) in said set angle of rotation.

8. The arrangement for parallel alignment of propeller shafts as claimed in claim 7, characterized in that said means for stabilization (46) consists of a body mounted onto said housing, via a rotating shaft (49) with friction in the bearings (50), in such a way that it can rotate and with a center of gravity that lies outside the axis of rotation.

9. A means for parallel alignment comprising a first calibrating device (37) with an adapter (38) and a housing (40) that can be rotated around an axis of rotation, which housing supports a light source (41) which emits rays of light within a plane at right angles to the axis of rotation, and a second calibrating device (42) with an adapter (43) and a reflecting surface (44), where the first calibrating device (37) comprises a target area (45), where it can be ascertained that the axis of rotation (39) of the first calibrating device (37) is parallel to the reflecting surface (44) of the second calibrating device when a ray of light which is emitted from the light source (41) of the first calibrating device is reflected on the reflecting surface (44) of the second calibrating device and incides within said target area (45), characterized in that the first calibrating device (37) comprises a means for stabilization (46) of the position of the rotating housing in a set angle of rotation around said axis of rotation (39), where said means for stabilization (46) is arranged to return the housing to said set angle of rotation or to lock the housing in said set angle of rotation.

10. The means for parallel alignment as claimed in claim 9, characterized in that said means for stabilization consists of a body mounted onto said housing (40), via a rotating shaft (49) with friction in the bearings (50), in such a way that it can rotate and with a center of gravity that lies outside the axis of rotation.

11. The means for parallel alignment as claimed in claim 9, characterized in that the reflecting surface (44) of the second calibrating device is convex in a direction towards the first calibrating device.

12. The means for parallel alignment as claimed in claim 11, characterized in that the reflecting surface (44) of the second calibrating device consists of a cylindrical mirror.

13. A method for aligning propeller shafts (61) parallel to each other and to the keel line (b) of the hull of a vessel in a first and a second underwater housing (6a, 6b) arranged on the hull of the vessel, which housings can be rotated around an axis of rotation (a) which is angled in relation to the propeller shaft (61) arranged in each underwater housing, where the method comprises the following method steps:

application of a first calibrating device which onto the first underwater housing and application of a second calibrating device onto the second underwater housing (S10);

where the first calibrating device (37) comprises a light source (41) which emits rays of light within a plane (P) at right angles to the propeller shaft (61) in the first underwater housing (6a) and in a direction towards the propeller shaft (61) in the second underwater housing (6b), where the second calibrating device (42) comprises a reflecting surface (44) and where the first calibrating device (37) comprises a target area (45) for a ray of light which is reflected in said reflecting surface (44) of the second calibrating device (42); and detection that the propeller shafts (61) are parallel (S30) when a ray of light which is emitted from the light source (41) of the first calibrating device is reflected on the reflecting surface (44) of the second calibrating device and incides within said target area (45).

14. The method as claimed in claim 13, wherein:

a servo motor (26) is arranged on each underwater housing (6a, 6b), which servo motor (26) is arranged to turn said underwater housing; and a position sensor (33, 34) is arranged for each servo motor (26), which position sensor is arranged to detect an angular position of the underwater housing (6a, 6b), characterized in that a memory (31\*) stores a position corresponding to the position indicated by the output signals (33) from the position sensors after the propeller shafts (61) have been aligned in a parallel position.

15. The method as claimed in claim 13, wherein the first calibrating device (37) comprises an adapter (38) and a housing (40) that can be rotated around an axis of rotation, which housing supports said light source (41), where the adapter (38) is attached in said underwater housing (6a) in a position where said axis of rotation (61) is parallel with the propeller shaft (61), characterized in that said housing (40) is caused to rotate, whereupon the light source (41) generates an illuminated plane at right angles to said axis of rotation.

16. The method as claimed in claim 13, wherein the first calibrating device comprises a means for stabilization (46) of the position of the rotating housing in a set rotational angle around said axis of rotation (39), where said means for stabilization (46) is arranged to return the housing (40) to said set angle of rotation or to lock the housing (40) in said set angle of rotation, characterized in that a first rough setting of the relative position of the propeller shafts is carried out while rotating the light source (41) and in that a fine adjustment of the relative position of the propeller shafts (61) is carried out without rotating the light source, by said means for stabilization (46) being utilized to fix the light source (41) in a direction towards the reflecting surface (44) of the second calibrating device.

\* \* \* \* \*